Dec. 4, 1928.

W. E. SYKES 1,694,041

MACHINE FOR CUTTING GEAR TEETH

Filed May 24, 1923    7 Sheets-Sheet 1

Fig. 1.

Inventor
William E. Sykes
By Henry E. Rockwell
Attorney

Dec. 4, 1928.

W. E. SYKES 1,694,041

MACHINE FOR CUTTING GEAR TEETH

Filed May 24, 1923 7 Sheets-Sheet 2

Inventor
William E. Sykes
By Henry E. Rockwell
Attorney

Dec. 4, 1928.

W. E. SYKES 1,694,041

MACHINE FOR CUTTING GEAR TEETH

Filed May 24, 1923 7 Sheets-Sheet 3

Dec. 4, 1928.　　　　　　　　　　W. E. SYKES　　　　　　　　1,694,041
MACHINE FOR CUTTING GEAR TEETH
Filed May 24, 1923　　　7 Sheets-Sheet 5

Inventor
William E. Sykes
By Henry E. Rockwell
Attorney

Patented Dec. 4, 1928.

1,694,041

UNITED STATES PATENT OFFICE.

WILLIAM EDWIN SYKES, OF SLOUGH, ENGLAND.

MACHINE FOR CUTTING GEAR TEETH.

Application filed May 24, 1923. Serial No. 641,127.

This invention relates to gear cutting machines, and more particularly to a machine, designed for cutting helical or double helical teeth upon a gear blank, in which one or more cutters are moved across the face of the gear blank during the cutting operation. The cutters are given, besides this reciprocatory movement across the face of the gear blank, a helical or twisting movement when cutting helical teeth, a bodily relieving movement to enable them to clear the work during their inoperative strokes, and to the cutters and work is imparted a continuous generating feeding movement to present the entire surface of the blank to the cutters.

The present application is a contination in part of my co-pending application Serial No. 484,713, filed July 14, 1921, and is more particularly concerned with certain features of construction designed to improve the operation of machines of this character when performing some kinds of work.

One object of my invention is the provision of an improved means for supporting the gear blank in operative relation to the cutters.

Another object of my invention is the provision of improved operating connections between the work carrying shaft and the source of power whereby the speed of rotation of the work may be easily varied when desired.

A still further object of my invention is the provision of improved means for supporting the work shaft, whereby gears of greatly varied sizes may be cut upon the same machine.

Other objects of the invention are the provision of certain features whereby the construction and operation of the machine are simplified, and the machine, as a whole, is made more economical and efficient.

To these and other ends the invention consists in the novel features and combination of parts to be hereinafter described and claimed.

In the accompanying drawings:

Fig. 3 is a side elevational view of the machine;

Fig. 3ª is a fragmentary side elevational view of the cutter relief operating mechanism with some parts broken away;

In the embodiment of my invention, which I have illustrated in Figs. 1 to 5 of the drawings, the machine comprises a main supporting frame, consisting of a bed 10, and a rear standard 11. Upon the bed 10 is slidably supported the work carriage, generally designated by the reference character "A", while upon the rear standard 11, are supported the cutters and their operating mechanism designated by the character "B", and the main power connections "C".

Figure 5:
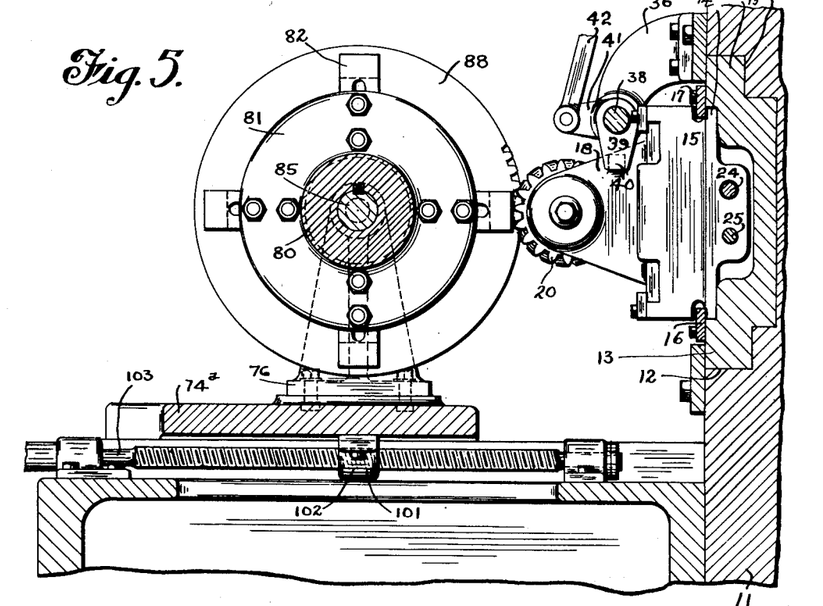
Fig. 5 is a sectional view on line 5—5 of Fig. 2.

As shown more particularly in Fig. 5, the standard 11 is provided with a guideway 12, in which is reciprocably mounted the cutter carrying slide 13, provided in turn with a guideway 14, in which are slidably mounted a pair of blocks 15, secured in place by the upper and lower plates 16 and 17.

Mounted in inclined guideways in each of the blocks 15, is a cutter carriage 18, provided with a bearing 19, in which bearings are rotatably mounted the cutters 20 and 21. The blocks 15 may be adjusted longitudinally of the slide 13, by means of the threaded shafts 24 and 25, journalled in the slide 13, and which are provided with squared ends 26 and 27, to which may be applied a wrench when it is desired to rotate these shafts and adjust the blocks 15 and the cutters 20 and 21 relatively to the main frame of the machine.

The cutters are secured upon spindles 28 and 29, the spindle 29 being in the form of a sleeve through which the spindle 28 is adapted to pass. To the spindles 28 and 29 are secured helical guiding sleeves 30 and 31, respectively, these guides being slidably and rotatably mounted in the sleeves 32 and 33. Suitable means (not shown) are provided within these sleeves to co-operate with the helical guides 30 and 31 to impart to the cutters a twisting or helical motion as they traverse the face of the work.

Figures 3, 3A:
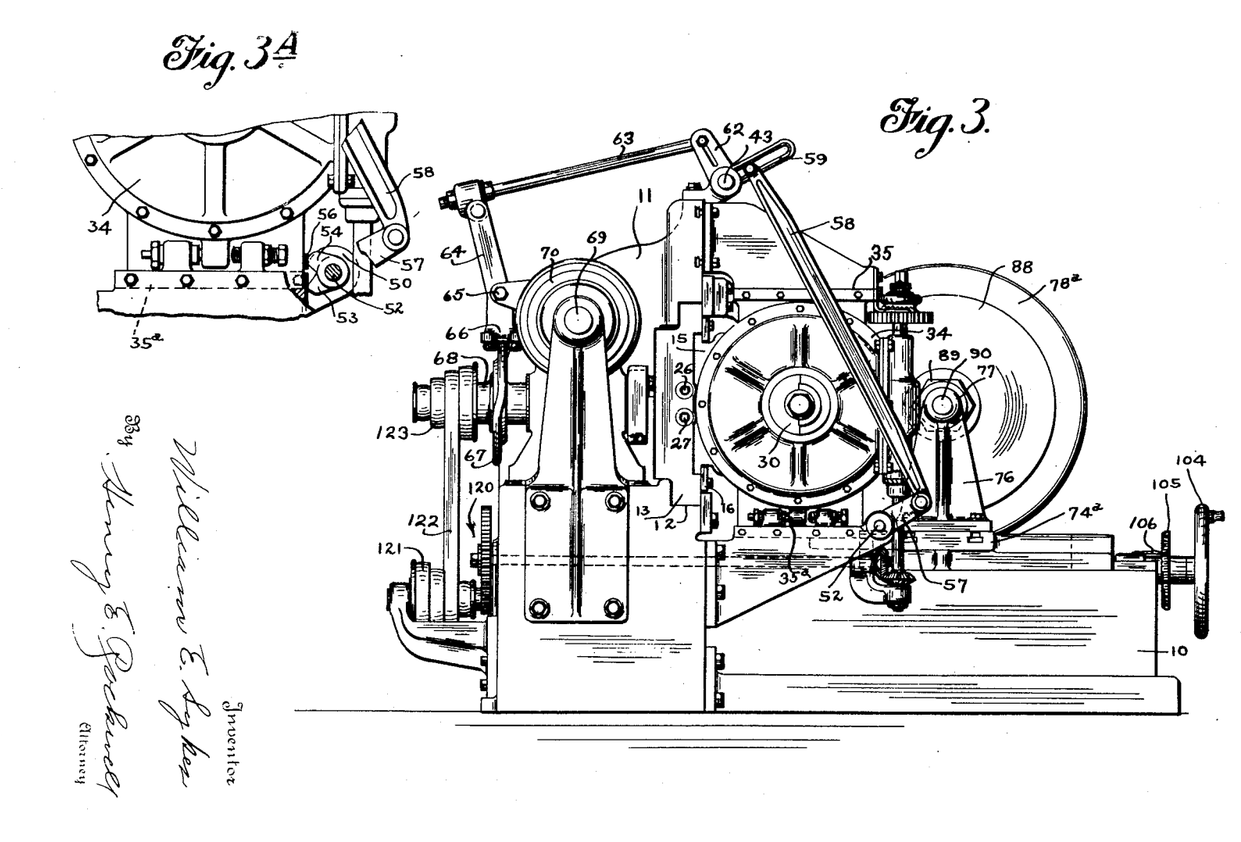
Figure 4:
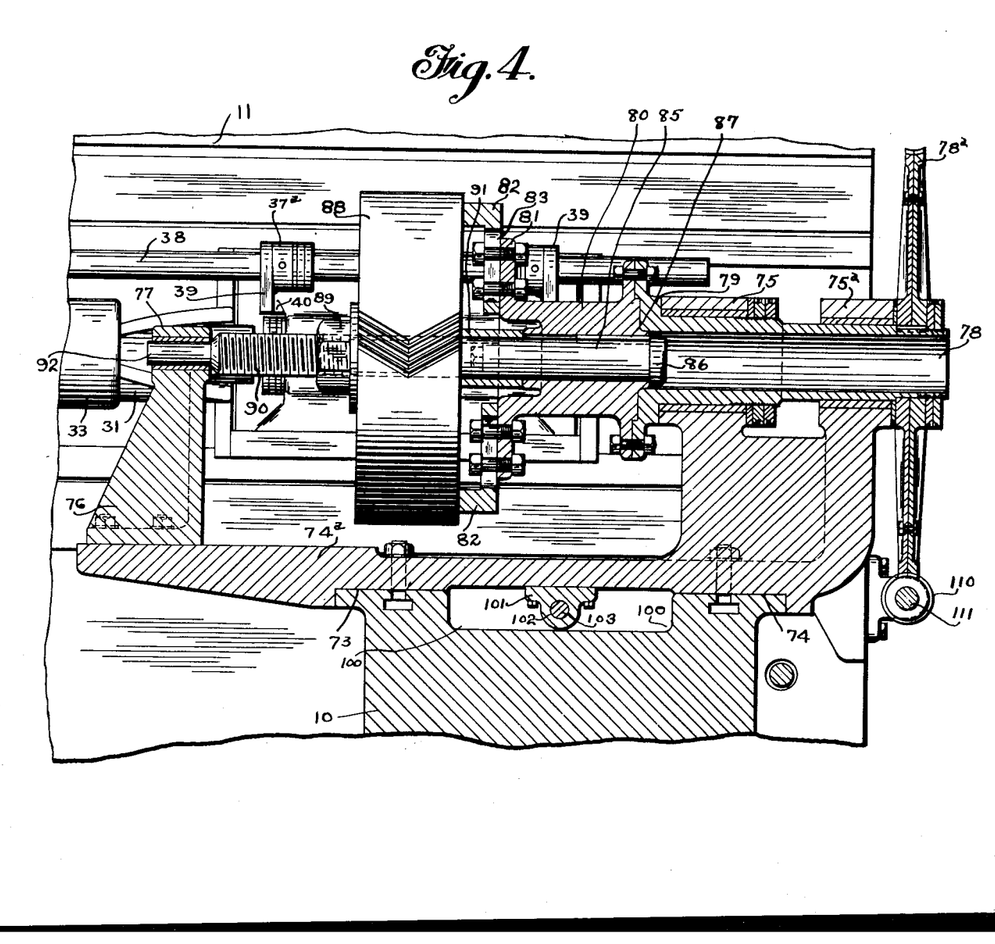
Fig. 4 is a sectional view on line 4—4 of Fig. 2.

As more particularly described in my co-pending application, Serial No. 641,126 filed May 24, 1923 the sleeves 32 and 33 are carried by casings 34, shown in Fig. 3, which casings are mounted in guides 35 and 35ᵃ for a limited sliding movement toward and away from the standard 11.

In order to give the cutters a bodily relieving movement in a direction away from the work, so that they will not drag upon the work during their inoperative strokes, it is only necessary to move the carriages 18 longitudinally of their inclined guideways in the blocks 15, and for this purpose, I have mounted in a suitable bearing 36, mounted upon the standard 11, and bearings 37 and 37ᵃ carried by the blocks 15, a cam shaft 38, to which is secured a pair of cams 39 co-operating respectively with lugs 40 upon the carriages 18 to move the latter in their guideways in the blocks 15, at the proper time. As this structure has been fully described and illustrated in my co-pending application, above referred to, a further description is not deemed necessary at this time.

The shaft 38 is oscillated by means of a crank 41, connected by a link 42 to a shaft 43, mounted in bearings 45 and 46 upon the standard 11.

When the cutters are moved away from the work, as described, the adjacent ends of the spindles 28 and 29 are likewise moved rearwardly or towards the standard 11, and to prevent a canting or twisting of these spindles, it is necesary to provide for a like movement of the sleeves 32 and 33. It is for this reason that the casings 34 are mounted to slide in the guideways 35 and 35ᵃ. In suitable bearings 50 and 51, upon the standard 11, is rotatably mounted a shaft 52, carrying cams 53 and 54, which engage parts 55 and 56 of the casings 34 to move these casings rearwardly toward the standard 11. These cams are staggered radially upon the rock shaft 52 so that one will be moved to an inoperative position out of engagement with the corresponding casing when the other is moved to a position in which it engages the casing with which it co-operates. The shaft 52 is oscillated by a crank arm 57, secured thereto and connected by a link 58 to a slotted crank 59, secured upon the shaft 43. It will be apparent that as both the shafts 52 and 38 are actuated from the same shaft 43, and as the ends of the cutter spindles are moved by the oscillation of the shafts 52 and 38, the ends of these spindles will be moved synchronously, so as to keep the cutter spindles in alignment.

As shown more especially in Fig. 3, the shaft 43 is oscillated through a slotted crank arm 62, connected by a link 63 to a lever 64, pivoted at 65 to the rear standard 11. The lower end of this lever 64 is bifurcated as at 66, and between the forks thereof operates a cam 67, secured upon a shaft 68, which may be connected by suitable gearing to a shaft 69, carrying a pulley 70, which is connected to the main source of power.

Upon a standard 72 on the bed plate 10, is provided a pair of slideways 73 and 74 and upon these ways is slidably mounted a work carriage, consisting of a bed plate 74ᵃ, provided with integrally formed journals 75 and 75ᵃ and a removable journal standard 76, having at its upper end a third journal 77. In the journals 75 and 75ᵃ is rotatably mounted a hollow shaft 78, to the outer end of which is secured a worm wheel 78ᵃ. This shaft extends through the two journals referred to and is formed at its inner end with a flange 79, to which is secured the hub 80 of a face plate 81. To the face plate 81 are bolted, or otherwise suitably secured, a plurality of L shaped supporting arms 82, the arms being slotted at 83 to provide for radial adjustment upon the face plate 81.

Within the hub 80 of the face plate is mounted an arbor 85, provided with a head 86, which abuts against the end of the hub and lies within the hollow shaft 78. This arbor may be inserted in position through the hollow shaft and is keyed as shown at 87, to the hub 80. The gear blank 88 is slipped upon this shaft and securely lodged against the edges of the L shaped arms 82, by means of a clamping nut 89, screwed upon the threaded end 90 of the arbor 85. If desired, a spacing sleeve 91, may be positioned between the gear blank hub and the hub 80 of the face plate. The threaded end of the arbor may be suitably reduced, as shown at 92, and be mounted in suitable bearings in the journal 77.

In mounting the gear blank in position upon the sliding carriage, the journal standard 76 may be removed from the carriage 74ᵃ, and the gear may then be placed upon the arbor 85. In some instances, it may be desirable to make a driving fit or press fit between this arbor and the hub 80 of the face plate 81, and a like fit between the arbor and the gear blank. This can be effected by removing the bolts which secure the hub 80 to the flange 79 or the hollow shaft 78, as well as the journal standard 76, and the arbor can then be driven into the hub of the face plate and into the gear blank and the parts replaced in the position shown in Fig. 4, the head 86 upon the arbor freely entering the bore of the shaft 78.

The standard 72 is provided with a channel 100 and within this channel a bracket 101 depends from the carriage plate 74ª. This bracket is provided with a threaded eye 102 for the reception of a threaded shaft 103 journaled in the standard 72 and provided at its outer end with a crank 104 by which it may be rotated, and also with an index wheel or dial 105 with which cooperates a pointer 106 by which may be determined the extent to which the work is set up to the cutters. It will be understood that the shaft 103 is threaded substantially throughout its length, as shown in Fig. 5, and that when this shaft is rotated by means of the crank wheel, the work carriage will be moved toward and from the cutters in order to set up the gear blank to the cutters and withdraw it therefrom. The dial may be arranged so that it may be set at 0 when the work has been moved up until it is barely scratched by the cutters, so that the pointer will thereafter indicate when the work has been further set up to secure the correct depth of tooth.

Figure 1:
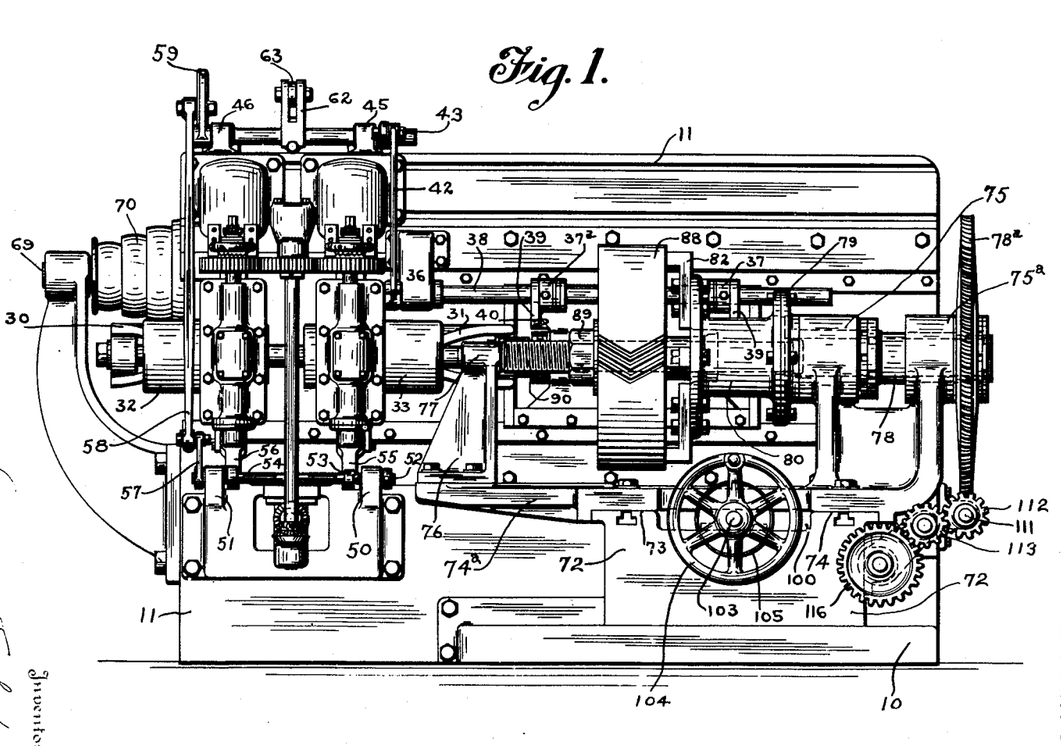
Fig. 1 is a front elevational view of the gear cutting machine, embodying my improvements.
Figure 2:
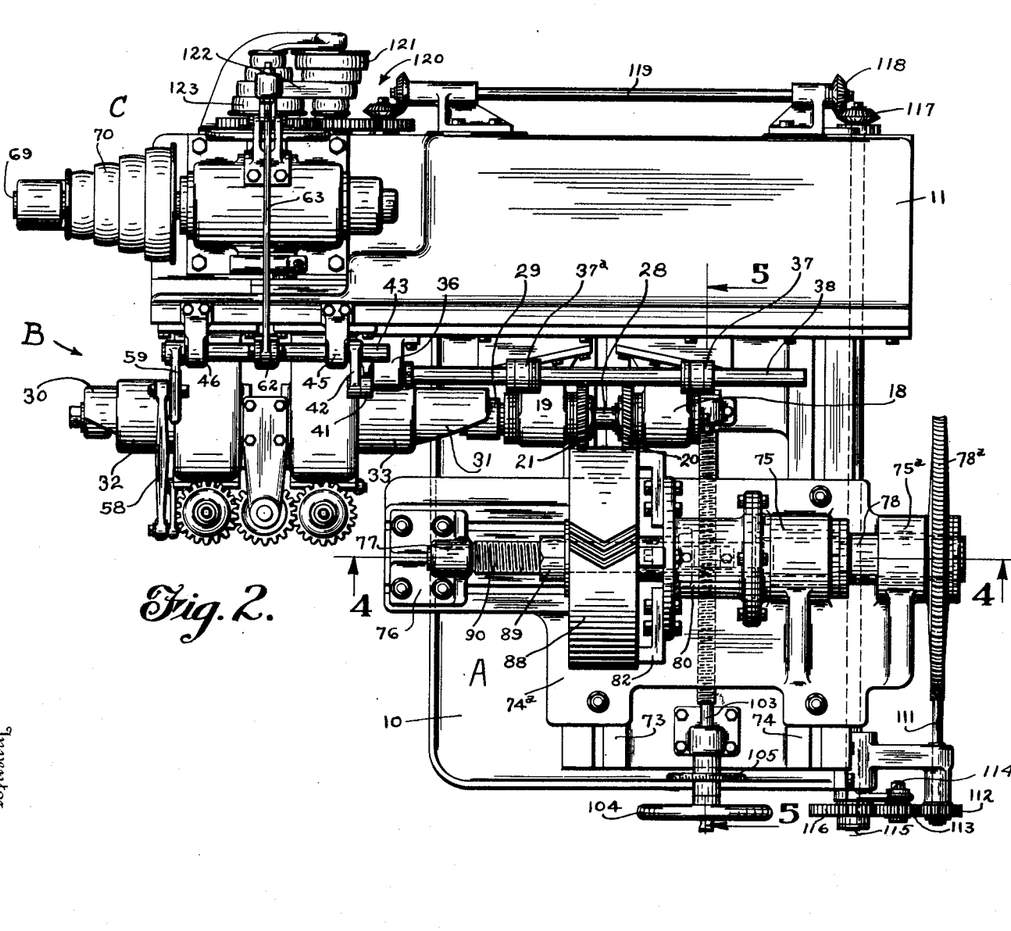
Fig. 2 is a top plan view of the machine.

The worm-wheel 78ª is driven by a worm 110 slidably mounted upon a shaft 111 suitably journaled on the bed plate 10. At the front of the machine, this shaft is provided with a gear 112 adapted to mesh with the teeth of a gear 113 rotatably mounted upon a swinging arm 114 journaled upon a shaft 115 upon which is secured a gear 116 which meshes with the gear 113. The described construction enables the gear 113 to be moved out of engagement with the gear 112 when the arm 114 is swung upwardly in order that the worm-wheel 78ª will not be rotated during certain adjustments of the gear blank. Also, this arrangement provides for a convenient method of changing the velocity of rotation of the gear blank by the substitution of gears of other sizes for the gear 112, in order that, regardless of the diameter of the blank, it may have the same peripheral velocity as that of the cutters. The worm 110 may be slidably mounted on the shaft 111 so that it will properly engage the teeth of the worm-wheel 78ª, although the shaft 78 may be set at various distances from the cutters to accommodate gear blanks of varied diameter. The shaft 115, as shown in Fig. 2, extends along the machine bed from front to back, and, at its rear end, is provided with a gear 117 which meshes with the gear 118 secured to a shaft 119, in turn connected by suitable gearing 120 to a pulley 121, around which is trained a belt 122 which also passes about a pulley 123 on the shaft 68, which, as heretofore described, is rotated from the main pulley 70.

Figure 6:
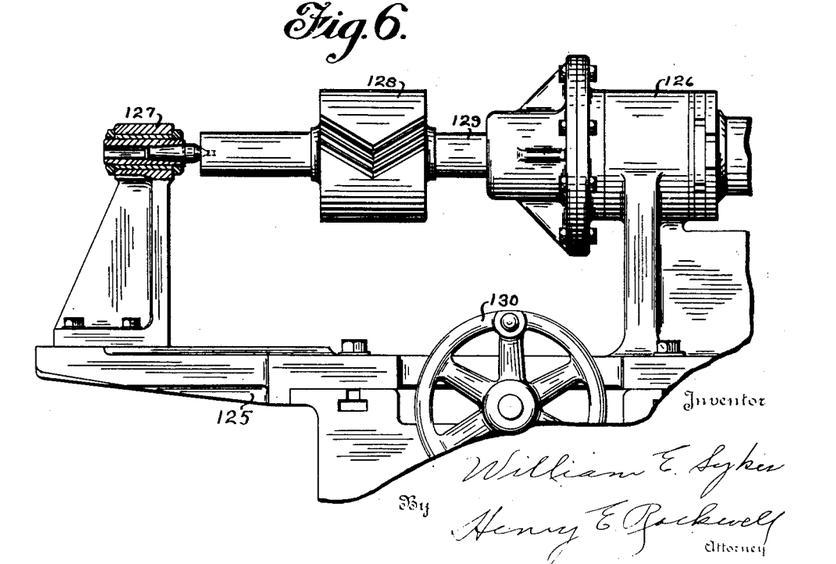
Fig. 6 is an elevational view showing a work support of modified form.

In Fig. 6 of the drawings, I have shown a work support of modified form wherein the carriage 125 is provided with a head stock 126 and a tail stock 127, which are designed more particularly to support a gear blank 128 rigidly or permanently secured to a shaft 129. The carriage, in this instance, is mounted upon suitable slides upon the bed plate, as shown in Figs. 1 to 4, and may be moved forwardly and rearwardly by means of the crank 130 in the same manner as described in connection with the device shown in those Figures of the drawings.

Figure 7:
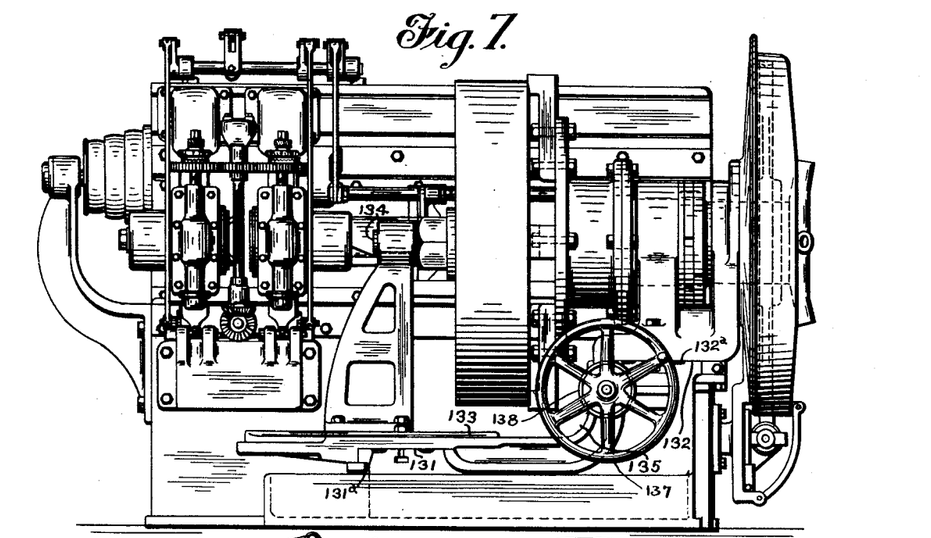
Fig. 7 shows in front elevation, a machine of modified form.
Figure 8:
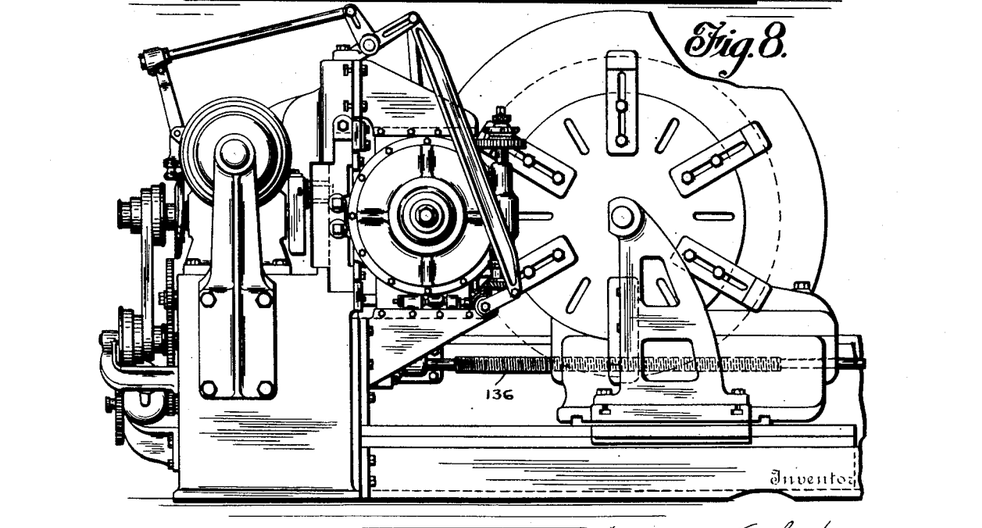
Fig. 8 is a side elevational view of the device shown in Fig. 7.
Figure 9:
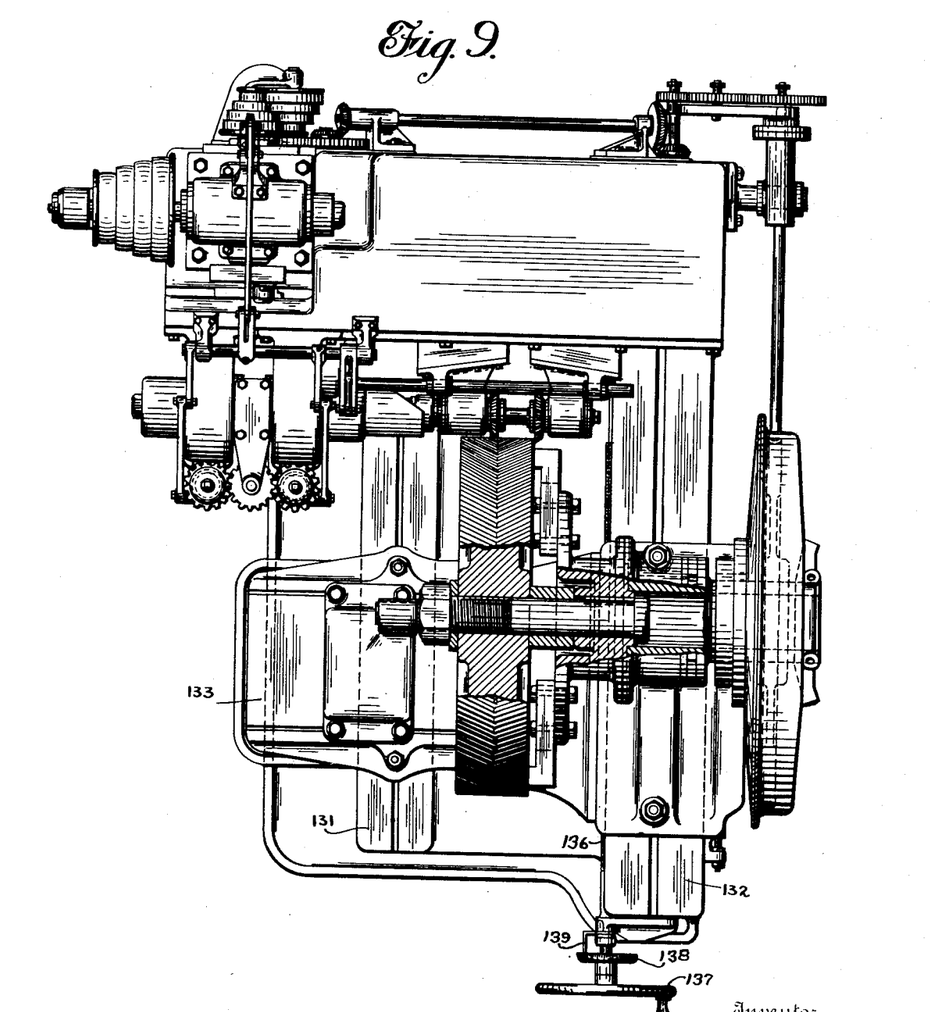
Fig. 9 is a top plan view of the device shown in Figs. 7 and 8, the work support being shown in section.

In Figs. 7, 8 and 9 of the drawings, I have shown a modified form of machine in which the bed plate 10 is provided with step ways 131 and 132 upon which the carriage 133 is mounted. It will be noted that the slide way 131 is disposed at a level considerably lower than the slide way 132, in order that the carriage at this point may be disposed at a considerable distance below the work shaft 134 to accommodate a gear blank of large diameter. In this case, the carriage frame is similarly stepped or offset, as shown at 135, in order that it may properly rest upon the slideways, the carriage being substantially L shaped in cross section and being provided upon its lower face with bearing surfaces 131ª and 132ª to co-operate with the guideways 131 and 132. The blank supporting mechanism, as clearly shown in Fig. 9, is constructed like that shown and described in connection with Figs. 1 to 4. The operating mechanism for the cutter spindles and for the work shaft is the same as that shown and described in my copending application, Serial No. 641,126, filed May 24, 1923. The work carriage, in this instance, may be moved toward and from the cutters by means of a threaded shaft 136 journaled in the bed of the machine and having a threaded engagement with the carriage. It is provided with the usual operating crank 137 and the dial 138 and pointer 139 to accurately gauge the depth of tooth being cut, as heretofore described.

While I have shown and described some preferred embodiments of my invention, it will be understood that it is not to be limited to all the details shown, but is capable of modification and variation within the spirit of the invention and within the scope of the appended claims.

I do not claim in this application the method of cutting helical gears in the manner described as being carried out by my improved machine, as this forms the subject matter of my copending application, Serial No. 641,125 filed May 24, 1923; neither do I claim the features of operation and construction of my improved gear cutting machine, which are described and claimed in my copending application, Serial No. 641,126 filed May 24, 1923.

What I claim is:

1. In a machine of the character described, work supporting means comprising a work supporting arbor having an enlarged head thereon, a face plate having a hub surrounding the arbor and lodged against said head, means for holding the work against the face plate whereby the latter is clamped between the head and the work, a head stock comprising a rotatably mounted shaft, means for detachably securing the face plate to said shaft to support the face plate and the adjacent end of the arbor, and means for rotatably supporting the other end of the arbor.

2. In a machine of the character described, work supporting means comprising a frame, a head stock thereon a shaft rotatably mounted in the head stock, a hollow face plate detachably secured to the shaft, an arbor mounted within and having a driving connection with the face plate and adapted to support the work with the latter abutting the face plate, the arbor having a head upon one end thereof abutting the end of the face plate on the opposite side of the work, means for urging the work against the face plate, and means for rotatably supporting the other end of the arbor.

3. A gear cutting machine, comprising a frame, a carriage slidably mounted on the frame, and means for supporting a gear blank upon the carriage, comprising a shaft rotatably mounted on the carriage, a hollow face plate secured to the shaft, an arbor mounted within, and having a driving connection with, the face plate and adapted to support the gear blank with the latter abutting the face plate, the arbor having a head upon one end thereof abutting the end of the face plate on the opposite side from the blank and means for rotatably supporting the other end of the arbor, whereby the arbor and blank may be removed by disconnecting the face plate from the rotatable shaft.

4. In a machine of the character described, a frame, a shaft rotatably mounted thereon, a hollow face plate detachably secured to the shaft against longitudinal movement relatively thereto, an arbor mounted within and having a driving connection with the face plate and adapted to support the work with the latter abutting the face plate, the arbor having a head upon one end thereof abutting the end of the face plate on the opposite side from the work, means for urging the work against the face plate to clamp the latter between the work and the head, and means for rotatably supporting the other end of the arbor.

5. A gear cutting machine, comprising a frame, a carriage slidably mounted on the frame and means for supporting a gear blank upon the carriage, comprising a shaft rotatably mounted on the carriage, a flanged face plate removably secured to the shaft and forming a continuation thereof, an arbor secured at one end to, and having a driving connection with, the face plate, means for rotatably supporting the other end of the arbor, said arbor being adapted to support the gear blank thereon, and radially adjustable means on the flange of said face plate to abut against the side of the blank.

6. A gear cutting machine, comprising a frame, a carriage slidably mounted on the frame, and means for supporting a gear blank upon the carriage, comprising a shaft rotatably mounted on the carriage, a flanged face plate removably secured to the shaft, an arbor secured at one end to, and having a driving connection with, the face plate, means for rotatably supporting the other end of the arbor, said blank being supported on the arbor and L shaped arms on the flange of said face plate having portions abutting against the side of the blank.

7. A gear cutting machine, comprising a frame, a carriage slidably mounted on the frame and means for supporting a gear blank upon the carriage, comprising a shaft rotatably mounted on the carriage, a flanged face plate removably secured to the shaft, an arbor secured at one end to, and having a driving connection with, the face plate, means for rotatably supporting the other end of the arbor, said blank being supported on the arbor and radially adjustable L shaped arms on the flange of said face plate having portions abutting against the side of the blank.

8. A gear cutting machine comprising a carriage, a shaft rotatably mounted thereon, an arbor adapted to support a gear blank and having an enlarged head upon one end thereof, a face plate having a driving connection with and surrounding the arbor and adapted to be clamped between the gear blank and said enlarged head, and means for removably securing the face plate to the rotatable shaft.

9. A gear cutting machine, comprising a frame having a bed, the bed being provided with vertically offset guideways, a carriage mounted to slide upon the frame and having an offset portion whereby the parts of the lower surface thereof rest upon said guideways, and its surface may be cleared by a blank of large diameter, and means on said carriage for supporting a gear blank.

10. A gear cutting machine, comprising a frame having a bed and vertically offset guideways on said bed, a carriage mounted to slide upon said guideways and said carriage being offset whereby its lower surface conforms to the position of said guideways, bearings mounted upon the offset portion of said carriage to support a work shaft, whereby said shaft is at a greater distance from one of said guideways than from the other to provide for the mounting on the shaft of a blank of large diameter.

11. A gear cutting machine, comprising a frame having a bed and vertically offset guideways on said bed, a work carriage slidably mounted on said guideways, said carriage being substantially L-shaped in cross section to conform to the position of said guideways whereby a part of said carriage surface is offset, horizontally aligned bearings mounted on the offset portions of said carriage, a work carrying shaft carried in said bearings and having a head stock mounted above the upper of said guideways.

12. A gear cutting machine, comprising a frame having a bed and vertically offset guideways on said bed, a work carriage slidably mounted on said guideways, said carriage being substantially L-shaped in cross section to conform to the position of said guideways, whereby a part of said carriage surface is offset, horizontally aligned bearings mounted on the offset portions of said carriage, a work carrying shaft carried in said bearings and having a head stock mounted above the upper of said guideways, and the other of said bearings being removable to facilitate the removal of the work shaft from the carriage.

13. A gear cutting machine, comprising a frame having horizontally disposed, stepped guideways and a work carriage slidably mounted on said guideways, and having stepped bearing surfaces to cooperate therewith, the upper surface of said carriage having horizontally aligned bearing members thereon, and a work carrying shaft mounted in said bearings with its head stock adjacent the upper of said guideways.

14. A gear cutting machine, comprising a frame, a work carriage slidably mounted on said frame and having horizontally disposed supporting surfaces arranged one in a plane below the other whereby a blank of large diameter may be supported thereon and a blank carrying shaft mounted in bearings on the carriage, the bearing members for the head stock of said shaft being adjacent the upper of said supporting surfaces.

15. A gear cutting machine, comprising a frame, a work carriage mounted to slide horizontally on the frame and being offset so that one portion thereof lies in a plane above another portion, a bearing member removably secured to the lower of said portions of the carriage, a second bearing member on the upper of said portions, and a work shaft mounted in said bearings and having its head stock adjacent the upper of said offset portions of the carriage.

16. A gear cutting machine, comprising a frame having stepped guideways, a work carriage being offset to correspond with the difference in level of said guideways and having bearing surfaces upon the lower faces of said offset portions to cooperate with said guideways.

17. A gear cutting machine, comprising a frame, a pair of cutters, spindles on which the cutters are mounted, casings movably mounted on the frame and having said spindles journaled therein, a rock shaft mounted on the frame and means on said rock shaft engaging both of said casings to effect their movement when the shaft is actuated.

18. A gear cutting machine, comprising a frame, a pair of cutters, spindles on which the cutters are mounted, casings movably mounted on the frame and having said spindles journaled therein, a rock shaft mounted on the frame and cam means on said rock shaft engaging both of said casings to effect their movement when the shaft is actuated.

19. A gear cutting machine, comprising a frame, a pair of cutters, spindles on which the cutters are mounted, casings movably mounted on the frame and having said spindles journaled therein, a rock shaft mounted on the frame and means on said rock shaft to engage said casings independently to effect alternate movement thereof when the shaft is actuated.

20. A gear cutting machine, comprising a frame, a pair of cutters, spindles on which the cutters are mounted, casings movably mounted on the frame and having said spindles journaled therein, a rock shaft mounted on the frame and cams radially staggered on said rock shaft to engage both of said casings and effect alternate movement thereof when the shaft is actuated.

21. A gear cutting machine, comprising a frame, a pair of cutters, spindles on which the cutters are mounted, casings movably mounted on the frame and having said spindles journaled therein, a rock shaft journaled on the frame and means on said rock shaft engaging one of said casings when the shaft is rocked in one direction, and the other of said casings when the shaft is rocked in the other direction, to effect movement of the casings and spindles.

22. In a gear cutting machine, a frame, a carriage slidably mounted on the frame, means for supporting a gear blank upon the carriage, comprising a hollow flanged shaft rotatably mounted thereon, a face plate provided with a hollow hub, said hub being removably secured to the flange of said shaft, an arbor passing through the hub of the face plate and provided with a head resting in the hollow of said shaft and abutting the edge of the face plate hub, and means for securing a gear blank upon said arbor in a position abutting a part of said face plate.

23. A gear cutting machine, comprising a frame, a carriage slidably mounted on the frame, and means for supporting a gear blank upon the carriage, comprising a flanged shaft rotatably mounted on the carriage, a face plate provided with a hollow hub secured to the flange of said shaft, an arbor passing through said hub and provided with an enlarged head resting in a bore of said shaft and abutting against the edge of the face plate hub, radially adjustable arms on said face plate, means to secure a gear blank on said arbor against said arms, and a worm wheel secured to said flanged shaft.

In witness whereof, I have hereunto set my hand this fifteenth day of May 1923.

WILLIAM EDWIN SYKES.